United States Patent [19]
Ikelle et al.

[11] Patent Number: 6,101,448
[45] Date of Patent: Aug. 8, 2000

[54] MULTIPLE ATTENUATION OF MULTI-COMPONENT SEA-BOTTOM DATA

[75] Inventors: Luc Thomas Ikelle, Bryan, Tex.; Lasse Amundsen, Trondheim, Norway

[73] Assignee: Schlumberger Technology Corporation, Houston, Tex.

[21] Appl. No.: 09/227,945

[22] Filed: Jan. 11, 1999

[30] Foreign Application Priority Data

Jan. 15, 1998 [GB] United Kingdom .................... 9800741

[51] Int. Cl.⁷ .................................................. G01V 1/28
[52] U.S. Cl. .............................................. 702/17; 367/24
[58] Field of Search .......................... 367/21, 24; 702/17, 702/18

[56] References Cited

U.S. PATENT DOCUMENTS

| | | | |
|---|---|---|---|
| 2,757,356 | 7/1956 | Haggerty | 340/7 |
| 4,345,473 | 8/1982 | Berni | 73/516 |
| 4,486,865 | 12/1984 | Ruehle | 367/24 |
| 4,979,150 | 12/1990 | Barr | 367/24 |
| 5,365,492 | 11/1994 | Dragoset, Jr. | 367/21 |
| 5,621,700 | 4/1997 | Moldoveanu | 367/24 |
| 5,729,506 | 3/1998 | Dragoset, Jr. et al. | 367/24 |
| 5,793,702 | 8/1998 | Paffenholz | 367/24 |
| 5,825,716 | 10/1998 | Starr | 367/24 |

OTHER PUBLICATIONS

K.M. Schalkwijk, D.J. Verschuur, C.P.A. Wapenaar, Decomposition of ocean–bottom cable (OBC) data, Soc. Exploration Geophysics. Expanded Abstracts, 1997, pp. 8–11.

L. Amundsen, A. Reitan, "Decomposition of Multicomponent Sea– Floor Data Into Upgoing and Downgoing and P– and S–Waves", Geophysics, vol. 60, No. 2 (Mar.–Apr. 1995) pp. 563–572, 8 Figs.

White, J.E, "Seismic Wave Radiation—Transmission and Attenuation", McGraw–Hill, (1965), 3 pages.

*Primary Examiner*—Donald E. McElheny, Jr.
*Attorney, Agent, or Firm*—William L. Wang; William B. Batzer

[57] ABSTRACT

A method of attenuating multiples in signals recorded during a marine seismic survey is described using a multi-component data set of the survey and summing selected components of the data set after filtering components with a filter that combines recorded data from more that one receiver location and operates indiscriminately on P- and S-wave data.

13 Claims, 3 Drawing Sheets

MULTIPLE ATTENUATION OF MULTI-COMPONENT SEA-BOTTOM DATA

The present invention relates to methods of reducing or attenuating multiples in multi-component sea-bottom data.

BACKGROUND OF THE INVENTION

Marine seismic surveys are usually conducted by towing an energy source and seismic detectors behind a vessel. The source imparts an acoustic wave to the water, creating a wavefield which travels coherently into the underlying earth. As the wavefield strikes interfaces between earth formations, or strata, it is reflected back through the earth and water to the detectors, where it is converted to electrical signals and recorded. Through analysis of these signals, it is possible to determine the shape, position and lithology of the sub-bottom formations. In other marine survey methods, the detectors and/or sources are placed at or close to the sea bottom or in wells.

A problem encountered in marine surveying—as well as in inverse vertical seismic profiling or "VSP"—is that of water column reverberation. The problem, which arises as a result of the inherent reflectivity of the water surface and bottom, may be explained as follows. A seismic wave generated in (or reflected of) earth strata passes into the water in a generally upward direction. This wave, termed the "primary", travels through the water and past the seismic detector which records its presence. The wavefield continues upward to the water's surface, where it is reflected back downwards. This reflected, or "ghost", wavefield also travels through the water and past the detector(s), where it is again recorded. Depending upon the nature of the earth material at the water's bottom, the ghost wavefield may itself be reflected upwards through the water, giving rise to a series of one or more subsequent ghost reflections or multiples.

Free-surface multiple reflections can be classified according to their order, which is equal to the number of reflections from the free-surface. Thus, first order free-surface reflections comprise energy initially travelling downwardly from the sources (as opposed to "ghosting" where energy travels upwardly and is reflected from the free surface), is reflected upwardly from the sea bed or a boundary below the sea bed, and is then reflected downwardly from the free-surface to the hydrophones. Second order free-surface multiple reflections undergo two downward reflections from the sea-surface before being detected by the hydrophones, and so on.

This reverberation of the seismic wavefield in the water obscures seismic data, amplifying certain frequencies and attenuating others, thereby making it difficult to analyse the underlying earth formations.

In instances where the earth material at the water bottom is particularly hard, excess acoustic energy or noise generated by the seismic source can also become trapped in the water column, reverberating in the same manner as the reflected seismic waves themselves. This noise is often high in amplitude and, as a result, rends to cover the weaker seismic reflection signals sought for study.

In the art, Ruehle, in U.S. Pat. No. 4,486,865, discloses a technique for reducing ghosting wherein a pressure detector and a particle velocity detector positioned in close proximity to one another in the water. The output of at least one of the detectors is gain-adjusted and filtered, using a deconvolution operation having a predetermined amount of white noise to the zero lag of the autocorrelation function. The patent suggests that, by adding this deconvolved/gain-adjusted signal to the output of the other detector, ghost reflections may be cancelled. Dragoset, in U.S. Pat. No. 5,365,492, describes an iterative method of determining an scaling factor used to sum simultaneous pressure and velocity measurements.

Haggerty, in U.S. Pat. No. 2,757,356, discloses a marine seismic reflection surveying system in which two seismometer spreads are disposed at two distinct depths in the water such that water column reverberations received by them are 180 degrees out of phase. By combining the output of the detectors, the patent suggests that the reverberations will cancel.

White, in 'Seismic Wave Radiation—Transmission and Attenuation', McGraw-Hill, 1965, and later Barr, in U.S. Pat. No. 4,979,150, both propose the use of hydrophone/geophone pair to separate upwardly and downwardly travelling waves. Both use a plane wave decomposition of the wave equation to determine a scaling factor which allows to add measurements from the different detectors types. The suggested solution assumes however normal incidence of the waves.

Ikelle et al., in the UK Patent Application GB-A-9710435, use a Born series approach to eliminate multiples from sea-bottom surveys.

Berni, in U.S. Pat. No. 4,345,473, suggests the use of a vertical component accelerometer in combination with hydrophone for cancelling surface-reflected noise in marine seismic operations.

Gal'perin, in "Vertical Seismic Profiling," Special Publication No. 12 of the Society of Exploration Geophysicists, suggests the use of a seismic detector which combines the output of a pressure and velocity sensor for use in VSP surveying.

Moldoveanu, in U.S. Pat. No. 5,621,700, uses a pressure and velocity sensitive sea-bottom cable. The reverberations are attenuated by an averaging process involving the steps of adding the product of the pressure data times the absolute value of the velocity data and the product of the velocity data times the absolute value of the pressure data.

L. Amundsen and A. Reitan published in Geophysics, Vol. 60, 2, 1995, 563–572 a method for decomposing multi-component sea floor data, employing decomposition filters determined by plane wave analysis.

K. M. Schalkwijk et al. published in SEG, Expanded Abstracts, 1997, p. 8–11, a method of simultaneously decomposing the recorded wavefield into up- and downgoing and compressional (P-) and shear (S-) waves in a one-step decomposition. The described method did not provide satisfactory results when applied to real data.

In view of the above-cited references, it is seen as an object of this invention to provide methods of eliminating ghosts or multiples from marine surveys, particularly sea bottom measurements. It is a specific object of the invention to provide such a method without making assumption about the direction of incidence of the acoustic waves.

SUMMARY OF THE INVENTION

In accordance with the present invention there is provided a method of reducing multiples in data recorded during a marine seismic survey, comprising the steps of (a) providing seismic wavefield data recorded by seismic multi-component receivers wherein said data comprise measurements related to pressure and velocity components of said wavefield; (b) choosing a component of the wavefield; (c)

selecting two or more components of the provided wavefield data necessary to attenuate multiples in said chosen component; (d) filtering one or more of said selected components using a spatial filter which combines data components measured at different receiver locations and operates indiscriminately on P- and S-waves; and (e) summing the selected and filtered selected components to generate a reduced multiple variant of said chosen component.

In contrast to known attempts of scaling the different components of the wavefield before summation, such as described for example in the U.S. Pat. Nos. 4,486,865 and 5,365,492, the filter of the present invention is a spatial filter using a convolution operation which combines several traces to generate one output trace. A trace is the measurement of one component of the wavefield at one location.

In its most general embodiment, the filter is also frequency variant. Therefore it is possible to consider contributions of the wavefield with non-zero angle of incidence in a unified manner without having to separately calculate angle dependent scaling factors.

Regards the method described by K. M. Schalkwijk et al., in SEG, Expanded Abstracts, 1997, p. 8–11, the present invention separates the step of suppressing the downgoing multiples from the decomposition into compressional (P-) and shear (S-) waves. This approach leads to superior results when applied to real data.

The demultiple filter is preferably derived from a solution of the elastodynamic wave equation using the representation theorem. The demultiple filter attempts to reconstruct the downgoing wavefield from multi-component measurements. By subtracting the reconstructed downgoing wavefield from the measured total wavefield, the upgoing wavefield can be derived.

The filter is preferably a spatial filter using a convolution operation which combines several traces (measurements of single receivers) to generate one output trace. In its most general embodiment, the filter is also frequency variant.

As the demultiple filter is derived from the representation theorem instead of plane wave decomposition, the sea bottom can be arbitrarily irregular. The filter eliminates water reverberations as the methods described in the prior art. But it also attenuates other multiples that are not suppressed using a known method. Furthermore, the new method naturally encompasses non-zero offset signals without having to introduce separate directional factor.

In practice, measurement which combine signals from two different receivers, such as geophones and hydrophones, require additional calibration to match their output and, particularly in case of ocean bottom measurements, to match differences in the coupling of receiver and sea floor.

These and other features of the invention, preferred embodiments and variants thereof, and further advantages of the invention will become appreciated and understood by those skilled in the art from the detailed description and drawings below.

MODE(S) FOR CARRYING OUT THE INVENTION

Figure 1:
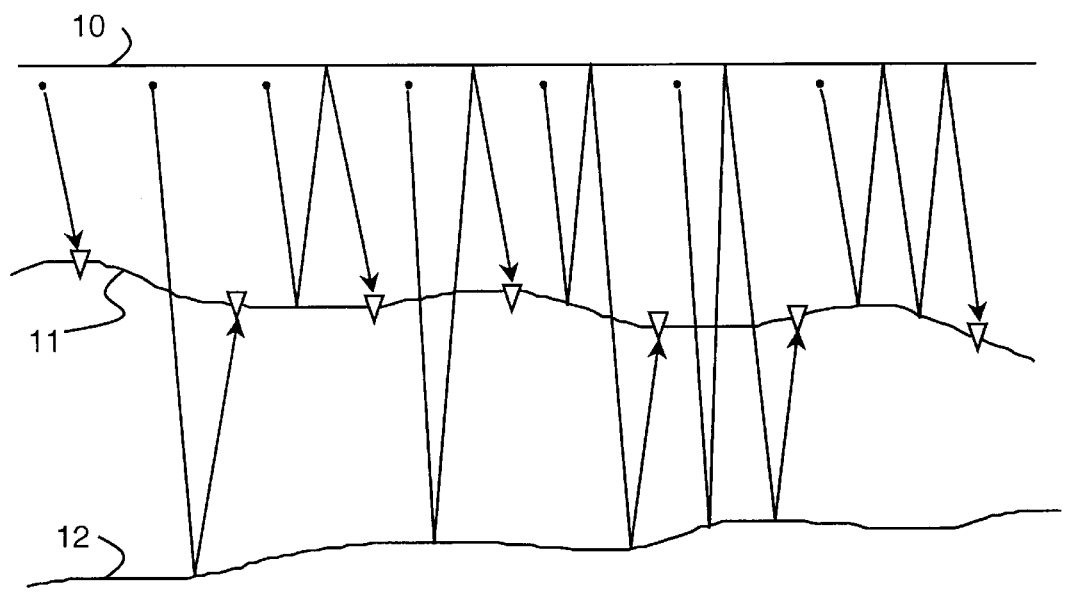
FIG. 1 schematically illustrates marine seismic events as registered in a sea bottom cable.

Referring to FIG. 1, there are shown typical sea bottom seismic events. A solid black circle denotes a source. A triangle denotes a receiver. In the examples, the sources are located close to the surface 10 of the sea. The receivers are located at the sea bottom 11. Below the sea bottom a single reflector 12 is shown at arbitrary depth. Signal paths are shown for various seismic events that lead to multiples in the recorded data. Depending on the direction of incidence at the receiver site, the event can be separated into upgoing (FIG. 2A) and downgoing (FIG. 2B) events.

Figure 2A:
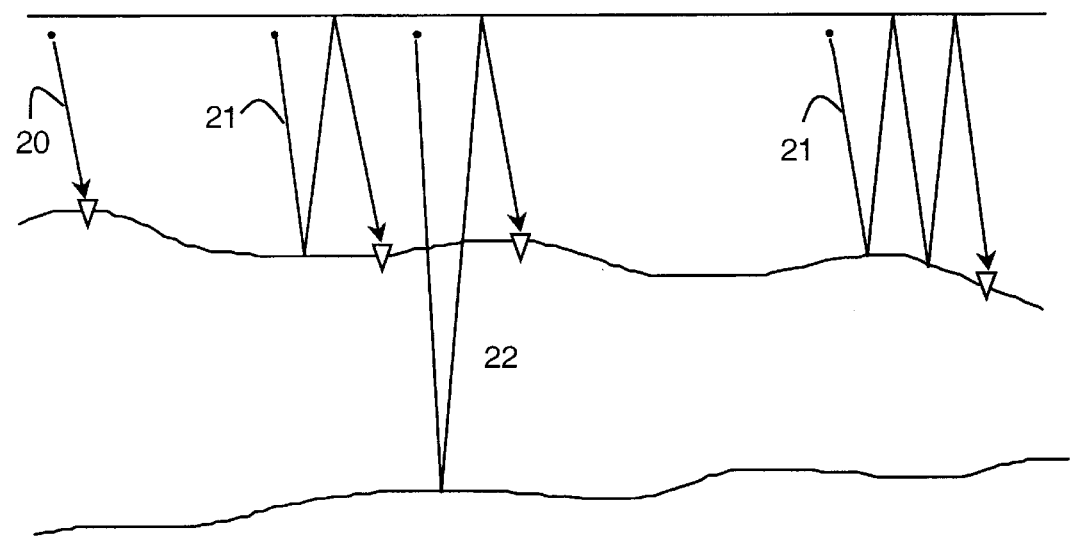
FIGS. 2A, B schematically illustrate up- and downgoing wavefield as registered in a sea bottom cable.
Figure 2B:
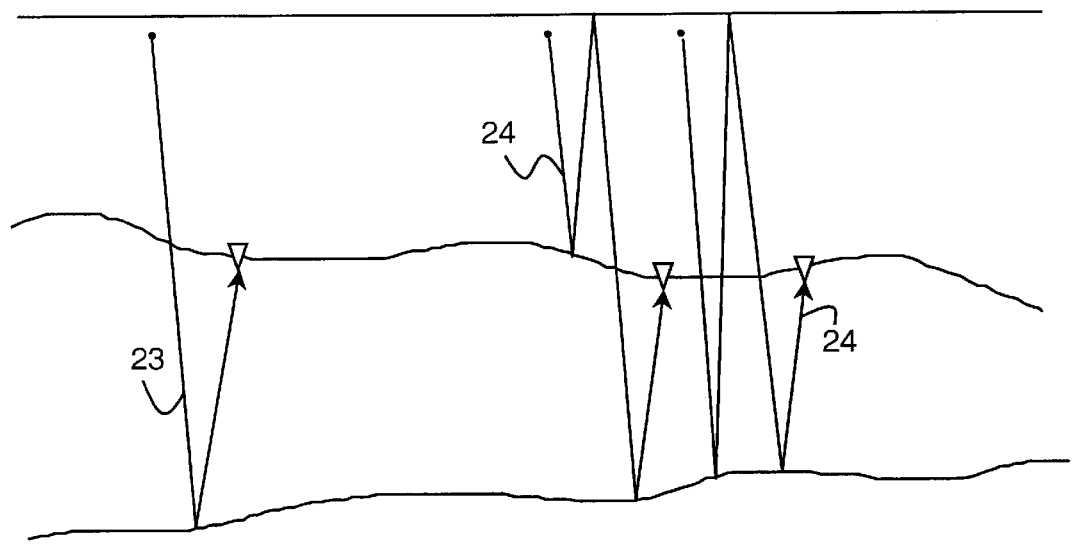

As illustrated by FIG. 2A, the downgoing wavefield contains essentially multiples, i.e., water-layer reverberations 21 and receiver peg-leg multiples 22. It also includes the sea bottom primary 20. The upgoing wavefield, shown in FIG. 2B, contains all primaries 23 except the sea floor primary and some multiples events, in particular the source peg-leg multiples 24 which are not included in the downgoing wavefield.

The new demultiple method as described below is based on the elastodynamic representation theorem. Let $v_j$ be the jth component of the particle velocity, and p the pressure. The corresponding demultipled fields just below the sea floor are denoted by a ~(tilde) superscript. It can be shown that the demultiple of $v_j$ can be written as $$\tilde{v}_j(\omega, x) = \qquad [1]$$
$$v_j(\omega, x) - \int_S dS(x')[(i\omega p(\omega, x')G_{3j}(x', x, k_\alpha, k_\beta) - v_i(\omega, x')$$
$$n_l \Sigma_{lij}(x', x, k_\alpha, k_\beta)]$$

at a point x in a given domain D limited by a surface S, and where $G_{ij}$ is the Green's tensor of the elastodynamic displacement field, $\Sigma_{pqk}$ is the Green's stress tensor, and $k_a = \omega/\alpha$ and $k_\beta = \omega/\beta$ are the P- and S-wave wavenumbers, respectively, and $\omega$ is the circular frequency. Using Hooke's law, a demultipled pressure measurement can be written as $$\tilde{p}(\omega, x) = i(\omega \, \rho(x))^{-1}\{(\alpha^2(x) - 2\beta^2(x))[\partial_1 \tilde{v}_1(\omega, x) + \partial_2 \tilde{v}_2(\omega, x)] + \alpha^2(x)\partial_3\tilde{v}_3(\omega, x)\} \qquad [2]$$

where the demultipled velocities v are given in eq. [1], and the $\partial_j$ denote partial derivatives, $\rho(x)$ gives the density at point x.

It is important to note that the equations [1] and [2] are general demultiple equations for ocean bottom data, and valid for an arbitrarily shaped sea floor and laterally varying medium parameters. To evaluate the equation, dynamic ray tracing can be used to derive a numerical expression for the Green's tensor elements. The sea floor profile S is an absorbing boundary for the Green's tensor.

Figure 3:
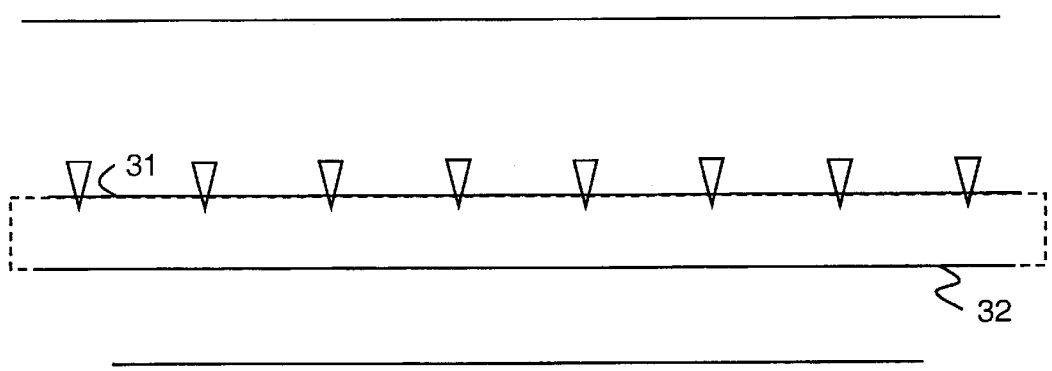
FIG. 3 graphically denotes the boundary conditions for a marine seismic survey using a sea bottom cable.

An analytic solution of the equations [1] and [2] can be derived by making simplifying assumptions. In the example below, it is for example assumed that the sea floor parameter are constant. For the evaluation the notation used in the equations [1] and [2] is modified. The points on the surface S are now denoted by $\xi$, $\xi'$ and those in the volume D are denoted by x, x'. The boundaries used for evaluating the integral equation [1] are shown in FIG. 3, where the domain D is bounded between the sea bottom 31 and another reference level 32 just below the sea bottom. The right and left borders of domain D extend to infinity. By bringing the reference level very close to sea floor, the computation of the downqoing wavefield can be reduced to evaluating the elastodynamic representation integral along the sea floor. By also assuming that the medium parameters just below the sea floor are constant, use can be made of the free-space Green's tensors for $G_{ij}(x, \omega, x')$ and $\Sigma_{pqk}(x, \omega, x')$. With these approximations, the elastodynamic representation integral can be analytically evaluated.

Let $\{p,v_x,v_y,v_z\}$ be the four component seismic data recorded directly at the sea floor; p denotes the pressure field, $v_x$, and $v_y$ denote the horizontal components of the particle velocity, and $v_z$, the vertical component of the particle velocity. In accordance with the standard up-down decomposition at a particular location, for instance the sea bottom, $\{p,v_x,v_y,v_z\}$ is decompose into a downgoing wavefield $\{p^D,v_x^D,v_y^D,v_z^D\}$ and a upgoing wavefield $\{p^U, v_x^U, v_y^U, v_z^U\}$ such that $$\{p,v_x,v_y,v_z\}=\{p^D,v_x^D,v_y^D,v_z^D\}+\{p^U,v_x^U,v_y^U,v_z^U\} \quad [3]$$

By using the representation theorem as described earlier, it is found that the upgoing wavefield $\{p^U,v_x^U,v_y^U,v_z^U\}$ can be determined using $$p^U(x_s, \xi, \omega)=\tfrac{1}{2}[p(x_s, \xi, \omega)-\Gamma^{p;v_z}(x_s, \xi, \omega)*v_z(x_s, \xi, \omega)]$$

$$v_x^U(x_s, \xi, \omega)=\tfrac{1}{2}[v_x(x_s, \xi, \omega)-\Gamma^{v_x;v_z}(x_s, \xi, \omega)*v_z(x_s, \xi, \omega)]$$

$$v_y^U(x_s, \xi, \omega)=\tfrac{1}{2}[v_y(x_s, \xi, \omega)-\Gamma^{v_y;v_z}(x_s, \xi, \omega)*v_z(x_s, \xi, \omega)]$$

$$v_z^U(x_s, \xi, \omega)=\tfrac{1}{2}[v_z(x_s, \xi, \omega)-\Gamma^{v_z;v_x}(x_s, \xi, \omega)*v_x(x_s, \xi, \omega)-\Gamma^{v_z;v_y}(x_s, \xi, \omega)*v_y(x_s, \xi, \omega)-\Gamma^{v_z;p}(x_s, \xi, \omega)*p(x_s, \xi, \omega)] \quad [4]$$

where $x_s=(x_s,y_s,z_s)$ is the source position and $\xi=(\xi_1, \xi_2, \xi_3)$ is the receiver position. The * symbol denotes spatial convolution with respect to $\xi$. The coefficients $\Gamma$ are known analytically. For example:

$$\Gamma^{p;v_z}(\xi, \omega) = \quad [5]$$

$$-i\omega\rho\left[1 + 4\left(\frac{\beta}{\omega}\right)^2(\partial_1^2+\partial_2^2) + 4\left(\frac{\beta}{\omega}\right)^4(\partial_1^2+\partial_2^2)^2\right]g_P(0, \xi, \omega) -$$

$$i\omega\rho\left[4\left(\frac{\beta}{\omega}\right)^4(\partial_1^2+\partial_2^2)\partial_3^2\right]g_S(o, \xi, \omega)$$

where $$g_P(0, \xi, \omega) = \frac{1}{4\pi}\frac{1}{|\xi|}\exp\left\{-i\frac{\omega}{\alpha}|\xi|\right\}, \quad [6]$$

$$g_S(0, \xi, \omega) = \frac{1}{4\pi}\frac{1}{|\xi|}\exp\left\{-i\frac{\omega}{\beta}|\xi|\right\},$$

and where the constants $\rho$, $\alpha$ and $\beta$ are density, P-wave velocity and S-wave velocity just below the sea bottom, respectively. As the receivers are positioned at the sea bottom, the derivatives in [5] are carried out along the sea floor surface (the derivative variable is $\xi$).

For practical applications, the filter $\Gamma$ may by approximated to limit the filter length and hence increase the speed at which the method can be implemented.

Of the various methods known to reduce the length of a filter while preserving its efficiency, two methods are described below:

Using a Taylor expansion on the filter in wavenumber domain the filter can be written as an infinite series in the horizontal wavenumber. By only keeping a given number of terms, these can be inverse Fourier transformed to space domain giving an approximate spatial demultiple filter. This filter is expressed in terms of powers of second derivative operators, which again can be approximated to the degree of accuracy required. This approach is the equivalent to developing one-way wave equations for wavefield extrapolation/migration resulting in the so-called well-known 5, 15, 30, 45 etc. degree equations—handling waves propagating with up to 5, 15, 30, 45 etc. degrees from the vertical axis correctly.

Using numerically optimized filters to determine by optimization a spatial filter of pre-defined length that has a wavenumber expression that fits in some sense the true wavenumber filter over a pre-defined wavenumber range. Such filters can be very short compared with the one given by eq. [4]. This approach is similar to the one used to optimize derivative operators for numerical derivation. Furthermore, the accuracy and the scope of the above-described method can be increased using various extensions: According to eq. [5], the coefficients $\Gamma$ are dependent of the sea bottom geometry and elastic parameter. In the case where these information are not available or are not sufficiently accurate, an optimisation similar to the one described in the International Patent Application WO96/20417 to determine these coefficients numerically. Because the wavefield separation used here is based on the representation theorem instead of plane wave decomposition, the sea floor can be arbitrarily irregular in the computation of upgoing wavefield described in eq. [4].

By applying a scattering series approach, further multiples can be removed from the upgoing wavefield.

Though the equation [4] for computing the field $\{p^U,v_x^U,v_y^U,v_z^U\}$ removes a significant amount of multiples, including all water body reverberations and all receiver peg-leg multiples as described in FIG. 2A, the process can be extended: Using an inverse scattering type operation, as described for example in the UK Patent Application GB-A-9710435, source peg-leg multiples (FIG. 2B) can be removed. The first terms of a scattering series for the upgoing pressure field are:

$$\hat{p}^U(x, \xi, \omega)=p^U(x, \xi, \omega)+A^1(\omega)p_1^U(x, \xi, \omega)+A^2(\omega)p_2^U(x, \xi, \omega)+\ldots, \quad [7]$$

where $$p_n^U(x_s, \xi, \omega) = \int_{-\infty}^{\infty} dx\, p^U(x, \xi, \omega)\int_{-\infty}^{\infty} dx'\, g_P(x, \omega, x')p_{n-1}^U(x', \xi, \omega). \quad [8]$$

Figure 4:
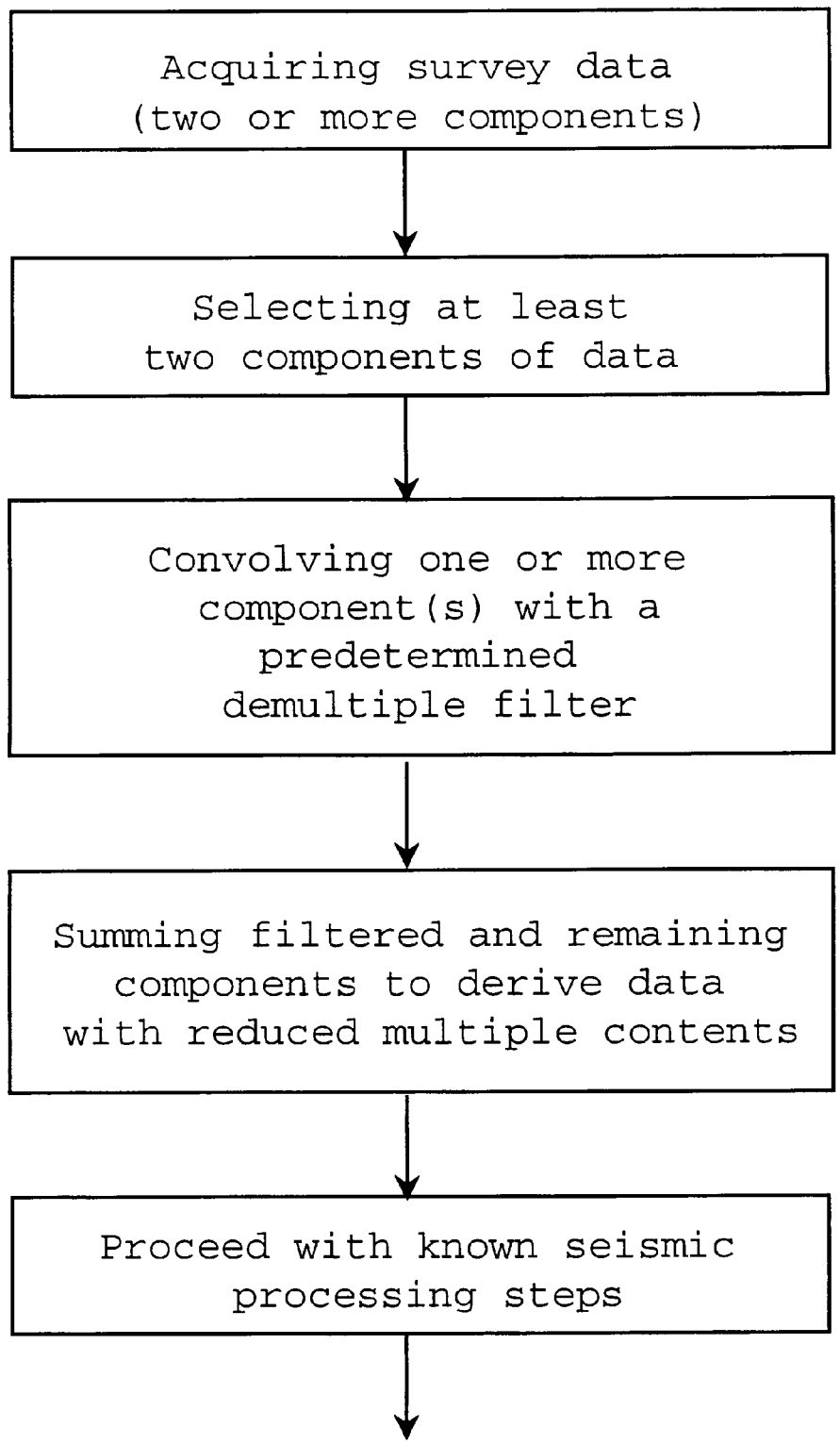
FIG. 4 shows a flow diagram illustrating basic steps of a method in accordance with the invention.

Referring now to FIG. 4, the basic steps are described for applying the multiple attenuation described above to shot gathers. Depending on the wavefield from which multiples are to be removed, a set of two or more components of the wavefields are selected. One of the following combinations must be selected: $\{p,v_z\}$, $\{v_x,v_z\}$, $\{v_y,v_z\}$, $\{p,v_z,v_x,v_y\}$. Any combinations of the horizontal component can be formed with the pressure field or the vertical velocity. The main steps for the application are described:

1. Collect multi-component prestack seismic data.
2. Select the component to be demultipled and select the other components needed for the substraction. For example, to demultiple the pressure p, select $v_z$.
3. Determine the demultiple filter by optimization or by directly using the equation [5] or both.
4. Perform the sum in [4] to obtain the demultiple $p^U$.

An extension of the present invention comprises the step of de-composing the measured wavefield into compressional (P-) waves and shear (S-) wave using, for example, the method described above by Amundsen and Reitan.

For the scope of the invention it is important to note that the filter $\Gamma$ of eqs. [4, 5] is derived in the x- $\omega$ domain. Using standard transformation methods, the filter can be transformed into other domains, such as f–k or $\tau$–p.

What is claimed is:

1. A method of reducing multiples in data recorded during a marine seismic survey, comprising the steps of
   (a) providing seismic wavefield data recorded by seismic multi-component receivers wherein said data comprise measurements related to pressure and velocity components of said wavefield;
   (b) choosing a component of the wavefield;
   (c) selecting two or more components of the provided wavefield data necessary to attenuate multiples in said chosen component;
   (d) filtering one or more of said selected components using a spatial filter which combines data components measured at different receiver locations and operates indiscriminately on P- and S-waves; and
   (e) summing the selected and filtered selected components to generate a reduced multiple variant of said chosen component.

2. The method of claim 1, wherein the filter includes wavefield contributions with zero and non-zero angles of incidence at a given receiver location.

3. The method of claim 1, further comprising the step of decomposing the wavefield into P- and S-waves using a separate filter.

4. The method of claim 1, wherein the filter is frequency dependent.

5. The method of claim 1, wherein the filter is spatially and frequency dependent.

6. The method of claim 1, wherein the chosen components are chosen from a group consisting of pressure p and three orthogonal velocity $v_x$, $v_y$, $v_y$.

7. The method of claim 1, wherein the chosen components are chosen from a group consisting of pressure p and three orthogonal velocity $v_x$, $v_y$, $v_z$, and the components necessary to attenuate multiples in said defined components are selected according to the following steps:

if the pressure p is chosen then select the pressure p and the vertical velocity component $v_z$ to reduce the multiples;

if the vertical component $v_z$ is chosen then select $v_z$, the pressure p, and the two horizontal velocity components $v_y$ and $v_y$; and if one of the two horizontal velocity components $v_y$ and $v_y$ is chosen then select said horizontal component and the vertical component $v_z$.

8. The method of claim 1, wherein the filter is based on a solution of the elastodynamic representation theorem.

9. The method of claim 1, wherein the filter reconstructs the downgoing wavefield from multi-component measurements of the total wavefield.

10. The method of claim 1, further including the step of using a correction to adapt for the output of different receiver types and sea floor coupling.

11. The method of claim 1, wherein the reduced multiple variant is further processed using known seismic data processing methods.

12. The method of claim 1, wherein the wavefield data are recorded by receivers located at the sea floor.

13. A marine seismic survey, comprising the step of laying out a receiver carrier on the sea floor, said receiver carrier comprising a plurality multi-component receivers able to receive at least two independent components of velocity and/or pressure measurements; generating acoustic energy to travel through earth formations below said receiver carrier; using said receivers to measure a multi-component wavefield data of said acoustic energy at receiver locations; and the further steps of
   (a) choosing a component of the wavefield;
   (b) selecting two or more components of the wavefield data necessary to attenuate multiples in said chosen component;
   (c) filtering one or more of said selected components using a spatial filter which combines data components measured at different receiver locations and operates indiscriminately on P- and S-waves; and
   (d) summing the selected and filtered selected components to generate a reduced multiple variant of said chosen component.

* * * * *